United States Patent
Okamoto et al.

[19]

[11] Patent Number: 5,864,194
[45] Date of Patent: Jan. 26, 1999

[54] STARTER

[75] Inventors: Kyoichi Okamoto; Yoshihiro Morimoto, both of Tokyo, Japan

[73] Assignee: Mitsubishi Denki Kabushiki Kaisha, Tokyo, Japan

[21] Appl. No.: 912,342

[22] Filed: Aug. 18, 1997

[30] Foreign Application Priority Data

Feb. 25, 1997 [JP] Japan ................................. 9-040664

[51] Int. Cl.⁶ ....................................................... H02K 5/16
[52] U.S. Cl. ........................... 310/239; 310/239; 310/240; 310/238
[58] Field of Search ........................... 310/239, 240, 310/238

[56] References Cited

U.S. PATENT DOCUMENTS 3,624,434  11/1971  Dafler ........................................ 310/239
4,538,085  8/1985  Tanaka ....................................... 310/239

FOREIGN PATENT DOCUMENTS 60-38054  3/1985  Japan .............................. H02K 5/14

*Primary Examiner*—Nestor Ramirez
*Assistant Examiner*—Thanh Lam
*Attorney, Agent, or Firm*—Sughrue, Mion, Zinn, Macpeak & Seas, PLLC

[57] ABSTRACT

In a starter, an armature is covered with a cylindrical yoke. A rear end opening portion of the yoke is spread perpendicularly outward so as to form a flange. A disc portion having a larger outer circumferential portion than the outer diameter of the cylindrical portion of the yoke is formed. A spigot portion provided in the outer circumference of the disc portion is fitted to a spigot portion provided in the frontmost of a cylindrical portion of a metal rear bracket so that the yoke and the rear bracket are fixedly connected to each other. Therefore, a brush device not limited by the outer diameter of the yoke can be provided. Accordingly, a long-life starter can be obtained by using sufficiently long brushes.

4 Claims, 5 Drawing Sheets

STARTER

BACKGROUND OF THE INVENTION

The present invention generally relates to a starter, and particularly to an assembling structure of a yoke, a brush device and a rear bracket.

First, a related art will be described below with reference to FIG. 10 which is a sectional view showing a conventional starter. Hereinafter, the right side and left side on the paper of the drawings are referred to as "front side" and "rear side", respectively. In FIG. 10, an armature 21 is enclosed in a cylindrical yoke 22. A cylindrical portion of a metal cup-like rear bracket 23 is attached to the rear end portion of the yoke 22 through spigot joint. A base 24 is fixed to the rear end inner surface of the rear bracket 23. Resin brush holding frames 25 are supported in the inside of the base 24. The armature 21 is constituted by an armature rotation shaft 26, a commutator 27 having segments formed on its outer circumference, and an armature coil 28 connected to the segments of the commutator 27. A bearing 29 which supports the armature rotation shaft 26 is fitted in the inner surface of an annular projection portion 23a of the rear bracket 23. Plus- and minus-side brushes 30 are received in the brush holding frames 25 and located in position respectively. The brushes 30 are pressed against the commutator 27 by means of brush springs 31. Further, a front bracket 32 is disposed on the front end portion of the starter, and a magnet switch 33 is provided on the upper portion of the starter.

In the aforementioned configuration, because the inner diameter of the rear bracket 23 fitted to the yoke 22 is smaller than the outer diameter of the yoke 22 and a brush device including the brush holders and brushes is received in the rear bracket 23, the outermost circumferential portion of the brush device becomes smaller than the inner diameter of the rear bracket 23. Accordingly, the outermost circumferential portion of the brush device must be smaller than the outer diameter of the yoke 22.

The operation of the starter will be described below. A current flows into a segment of the commutator 27 via the plus-side brush 30, and flows into the armature coil 28 from the segment of the commutator 27. Then, the current flowing-out from another segment of the commutator 27 flows, via the minus-side the brushes 30, into the base 24, the rear bracket 23 and the yoke 22 in the order successively so as to be finally grounded via the yoke 22.

Because the conventional starter is configured as described above, the inner diameter of the rear bracket is limited by the outer diameter of the yoke which is fitted to the rear bracket. Further, because the diameter of the outermost circumferential portion of the brush device is limited by the inner diameter of the rear bracket, the brushes which are constituent members of the brush device for supplying a current to the armature are limited in their length. It is therefore impossible to make the brushes have sufficient length, and it is impossible to attain a necessary brush life.

In the conventional structure, as described above, the brush life of the starter is be short. If the brush life is required to be prolonged in this case, it may be thought of to use brushes containing a large amount of carbon and a small amount of copper to increase their electric resistance. Such brushes are, however, unsuitable for a starter which requires large electric power instantaneously.

SUMMARY OF THE INVENTION

The present invention has been accomplished to solve the aforementioned problem, and has an object to provide a long-life starter in which a brush device not limited by the outer diameter of a yoke is assembled to thereby secure a sufficient brush length to prolong the life of brushes.

In order to achieve the above object, according to an aspect of the present invention, there ia provided a starter comprising: a cylindrical yoke having one and the other end portions in its axial direction and for receiving field system poles; a cylindrical brush receiving portion provided on the one end portion of the yoke so as to expand in a direction perpendicular to the axial direction of the yoke to receive a brush device therein; a first bracket provided on the other end portion of the yoke; and a second bracket fixed to the brush receiving portion so as to cooperate with the first bracket to rotatably support an armature.

Preferably, the brush receiving portion includes a cylindrical portion, and a disc-like plate portion for connecting the cylindrical portion and the yoke to each other; and the second bracket is fixed to the cylindrical portion.

Preferably, in the brush receiving portion, the cylindrical portion and the disc-like plate portion are formed from separate members.

Preferably, the disc-like plate portion of the brush receiving portion is formed integrally with the yoke; and the cylindrical portion of the brush receiving portion is formed integrally with the second bracket.

Preferably, the cylindrical portion and the disc-like plate portion of the brush receiving portion are formed integrally with the yoke.

Preferably, in the brush receiving portion, brush holders are fixed to the disc-like plate portion.

The starter according to the present invention is provided with a cylindrical yoke for receiving field system poles, a cylindrical brush receiving portion provided on one end portion of the yoke so as to expand radially or in the direction perpendicular to the axial direction of the yoke so as to receive a brush device therein, a first bracket provided on the other end portion of the yoke, and a second bracket fixed to the brush receiving portion so as to cooperate with the first bracket to rotatably support an armature. Accordingly, the first bracket having a large diameter can be assembled, and therefore, a brush device not limited by the outer diameter of the yoke can be assembled without increasing the number of parts. Accordingly, a long-life starter can be obtained by using sufficiently long brushes.

Further, the brush holders may be fixed to the plate member of the brush receiving portion. Accordingly, the plate member may serve also as a base for fixing the brush holders so that the number of parts can be reduced.

DESCRIPTION OF THE PREFERRED EMBODIMENTS

Embodiment 1

Figure 1:
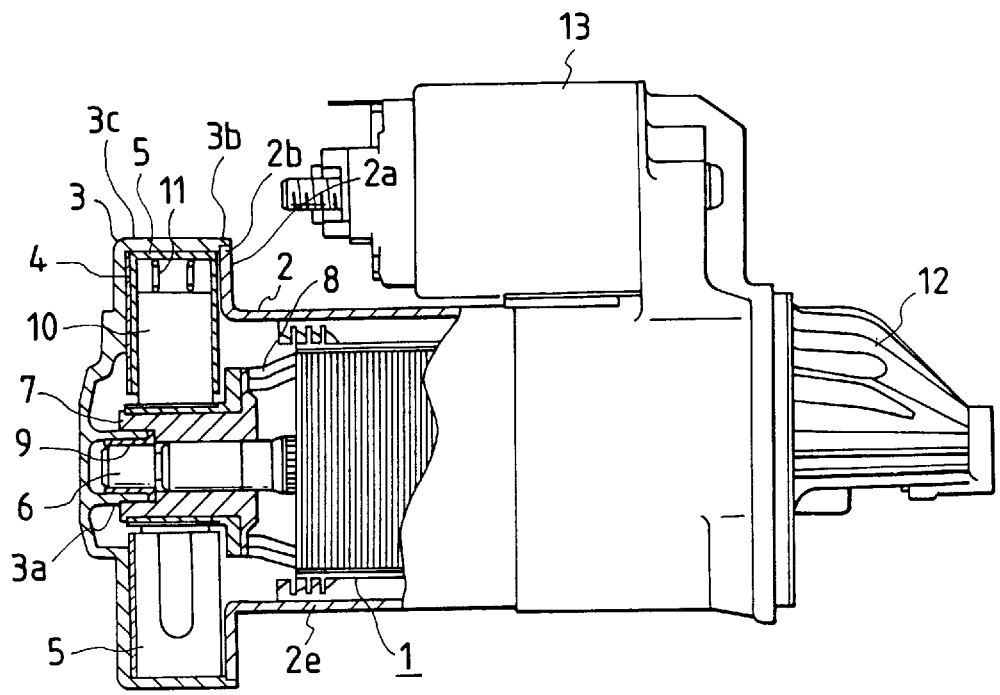
FIG. 1 is a sectional view showing a starter according to an embodiment of the present invention.

FIG. 1 is a sectional view showing a starter according to Embodiment 1 of the present invention. In FIG. 1, an armature 1 is covered with a cylindrical yoke 2. A rear end opening portion of the yoke 2 is spread perpendicularly outward so as to form a flange. That is, a disc portion 2a having a larger outer circumferential portion than the outer diameter of the cylindrical portion of the yoke 2 is formed. A spigot portion 2b provided in the outer circumference of the disc portion 2a is fitted to a spigot portion 3b provided in the frontmost of a cylindrical portion of a metal rear bracket 3 so that the yoke 2 and the rear bracket 3 are fixedly connected to each other. In this occasion, a cylindrical portion 3c of the rear bracket 3 joined to the yoke 2 is designed to have a diameter about 1.5 times as large as the diameter of a small-diameter cylindrical portion 2e of the yoke 2 correspondingly to the outer diameter of the disc portion 2a of the yoke 2.

A base 4 is fixed to the rear end inner surface of the rear bracket 3 and resin brush holding frames 5 are supported by the base 4. The armature 1 is constituted by an armature rotation shaft 6, a commutator 7 having segments in its outer circumference, and an armature coil 8 connected to the segments of the commutator 7. A bearing 9 is fitted into the inner surface of an annular projection portion 3a of the rear bracket 3 to support the armature rotation shaft 6. Plus- and minus-side brushes 10 are inserted in the brush holding frames 5 and located in position. The brushes 10 are urged to the commutator 7 by means of brush springs 11. Further, a front bracket 12 is disposed on the front end portion of the starter. Further, a magnet switch 13 is provided on the upper portion in FIG. 1.

The joint cylindrical portion 3c integrally formed with the rear bracket 3 is fitted to the disc portion 2a of the yoke 2 and axially tightened by means of a through-bolt (not shown) so as to be fixed together with the front bracket 12.

The operation of the thus configured starter will be described below. A current flows into a segment of the commutator 7 via the plus-side brush 10 and flows into the armature coil 8 from the segment of the commutator 7. Then, the current flowing-out from another segment of the commutator 7 flows, via the minus-side the brushes 10, in the base 4, the rear bracket 3 and the yoke 2 in the order successively so as to be finally grounded via the yoke 2.

As described above, the rear end of the cylindrical yoke 2 is spread radially outward so as to form a flange so that the rear bracket 3 having the large-diameter cylindrical portion 3c can be provided. Accordingly, a brush device not limited by the outer diameter of the yoke 2 can be provided without increasing the number of parts. Accordingly, a long-life starter can be obtained by using sufficiently long brushes 10.

Embodiment 2

Figure 2:
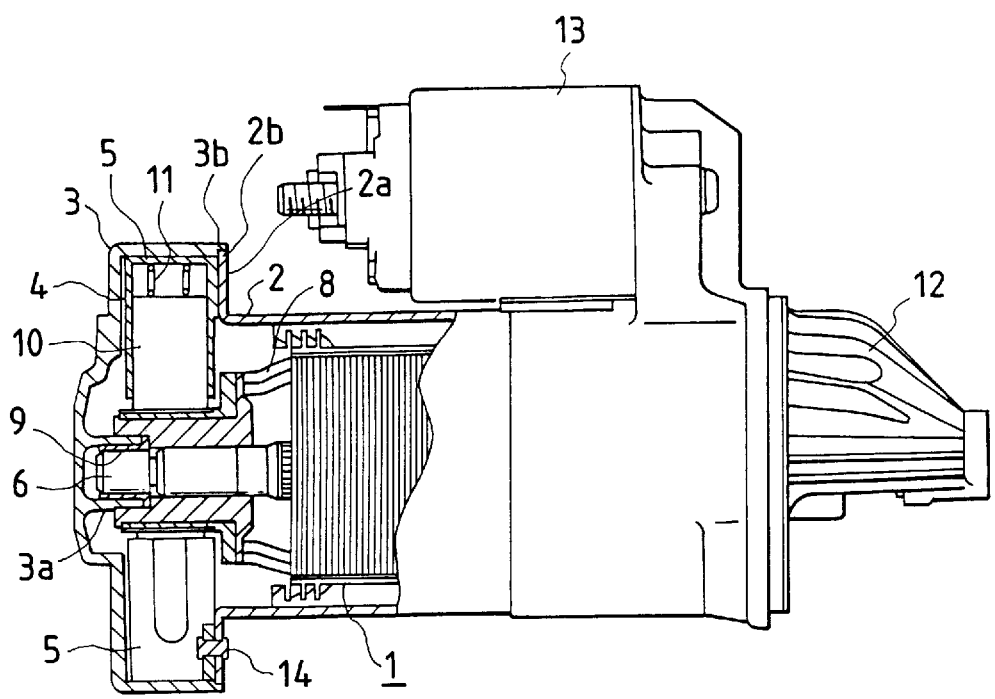
FIG. 2 is a sectional view showing a starter according to another embodiment of the present invention.

FIG. 2 is a sectional view showing a starter according to Embodiment 2 of the present invention. In this Embodiment 2, the parts equivalent to or corresponding to those in Embodiment 1 are referenced correspondingly and the description about those parts are omitted here. The structure of the yoke 2 and the rear bracket 3 and the assembling structure of the yoke and rear bracket are the same as those in the Embodiment 1. In this Embodiment 2, however, the brush holding frame 5 is fixed, by means of rivets 14, directly to the disc portion 2a provided at the rear end of the yoke 2.

Figure 3A:
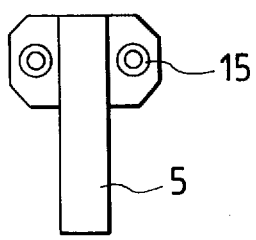
FIG. 3A is a plan view showing a brush holding frame in the starter depicted in FIG. 2.
Figure 3C:
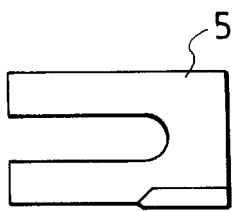
FIG. 3C is a side view showing the brush holding frame in the starter depicted in FIG. 2.
Figure 3B:
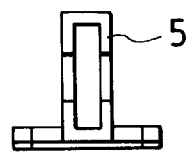
FIG. 3B is a front view showing the brush holding frame in the starter depicted in FIG. 2.

FIGS. 3A, 3B and 3C are a plan view, a front view and a side view, respectively, showing the brush holding frame 5 of an insulating material in this Embodiment 2. Rivet insertion holes 15 are provided in the brush holding frame 5.

In the aforementioned configuration, the disc portion 2a formed at the rear end of the yoke 2 can be made to serve also as a base for fixing the brush holding frames 5 as a constituent member of the brush device. Accordingly, not only the number of parts can be reduced but also a long-life starter can be obtained by using sufficiently long brushes 10.

Embodiment 3

Figure 4:
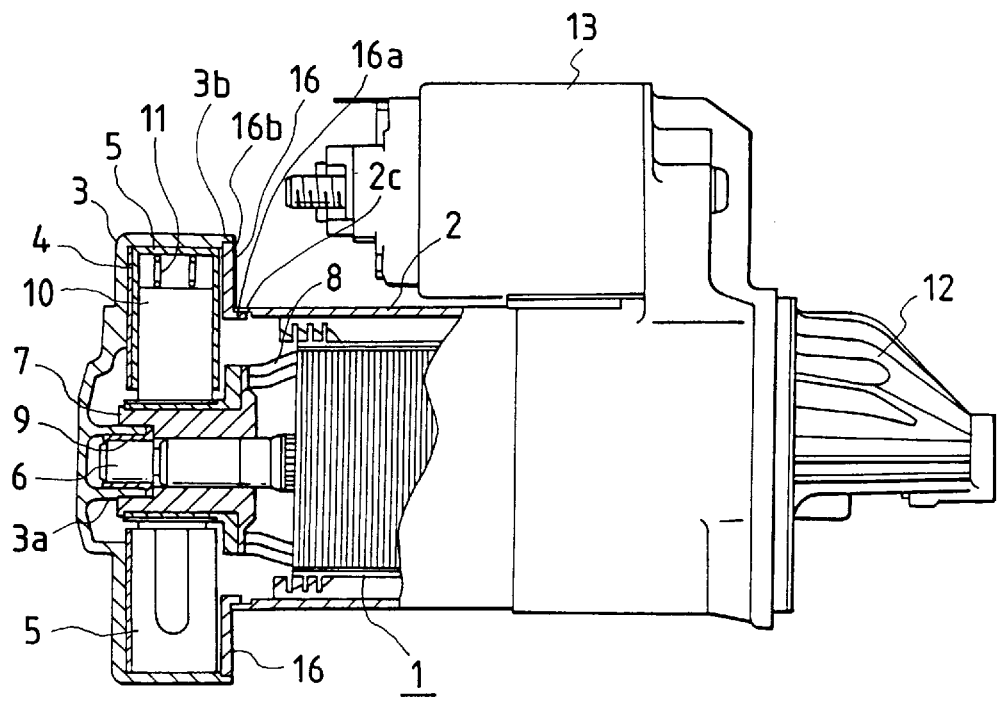
FIG. 4 is a sectional view showing a starter according to a further embodiment of the present invention.

FIG. 4 is a sectional view showing a starter according to Embodiment 3 of the present invention. In this Embodiment 3, the parts equivalent to or corresponding to those in Embodiments 1 and 2 are referenced correspondingly and the description about those parts are omitted here. In FIG. 4, a spigot portion 16a of a disc plate 16 made of a metal plate material is fitted to a spigot portion 2c provided on the rearmost of the cylindrical portion of the yoke 2. Further, a spigot portion 16b provided on the outer circumference of the plate 16 is fitted to a spigot portion 3b provided on the front most of the cylindrical portion of the rear bracket 3 so that the yoke 2 and the rear bracket 3 are fixed to each other.

When the disc plate 16 having such a simple shape that its center portion and its outer circumferential portion are fitted and fixed to the yoke 2 and the rear bracket 3 respectively is used in combination with the conventional cylindrical yoke 2 in the aforementioned manner, a long-life starter can be obtained by using sufficiently long brushes 10 without use of any new manufacturing apparatus.

Incidentally, the form of fixture of the brush holding frames 5 in FIG. 4 is the same as that in the Embodiment 1.

Alternatively, after the disc plate 16 is fitted to the yoke 2, the disc plate 16 may be fixed to the yoke 2 at several points by means of spot welding, or the like.

Embodiment 4

Figure 5:
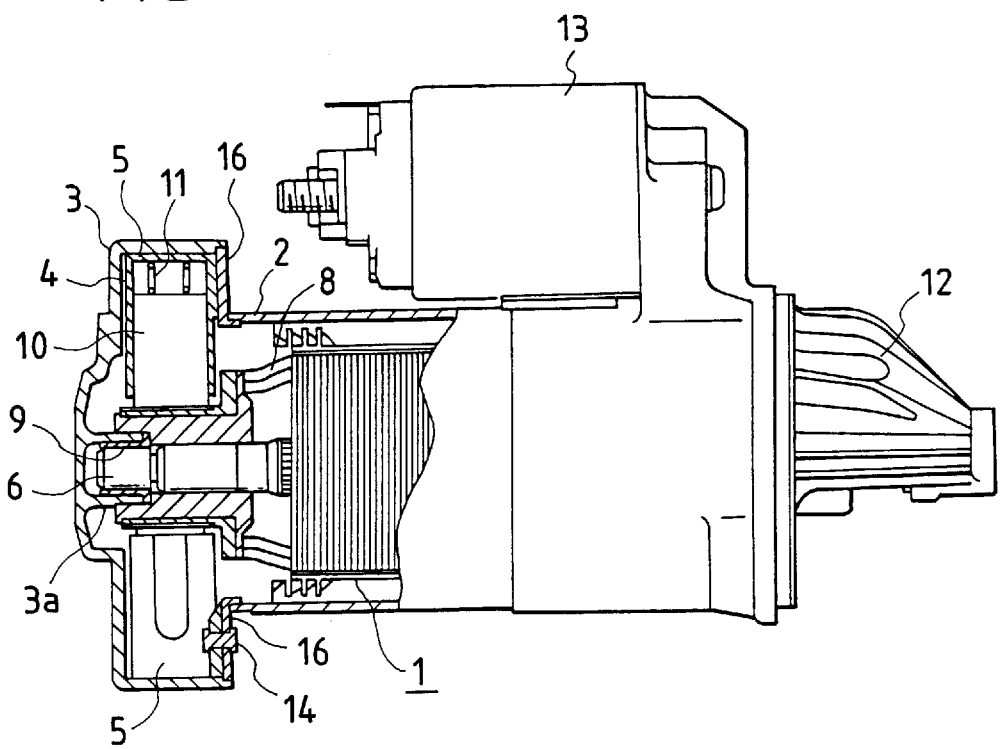
FIG. 5 is a sectional view showing a starter according to another embodiment of the present invention.

FIG. 5 is a sectional view showing a starter according to Embodiment 4 of the present invention. In this Embodiment 4, the parts equivalent to or corresponding to those in Embodiments 1 to 3 are referenced correspondingly and the description about those parts are omitted here. The structure of the yoke 2, the disc plate 16 and the rear brush 3 and assembling form thereof in this Embodiment 4 are the same as those in the Embodiment 3.

In this Embodiment 4, the brush holding frames 5 are fixed, by rivets 14, directly to the disc plate 16 fitted to the rear end of the yoke 2 and fitted to the front end of the rear bracket 3.

In the aforementioned configuration, the disc plate 16 having its center portion and its outer circumferential portion fitted and fixed to the yoke 2 and the bracket 3 respectively can serve also as a base for fixing the brush holding frame 5 as a constituent member of the brush device. Accordingly, not only the number of parts can be reduced but also a long-life starter can be obtained by using a sufficiently long brush 10.

Embodiment 5

Figure 6:
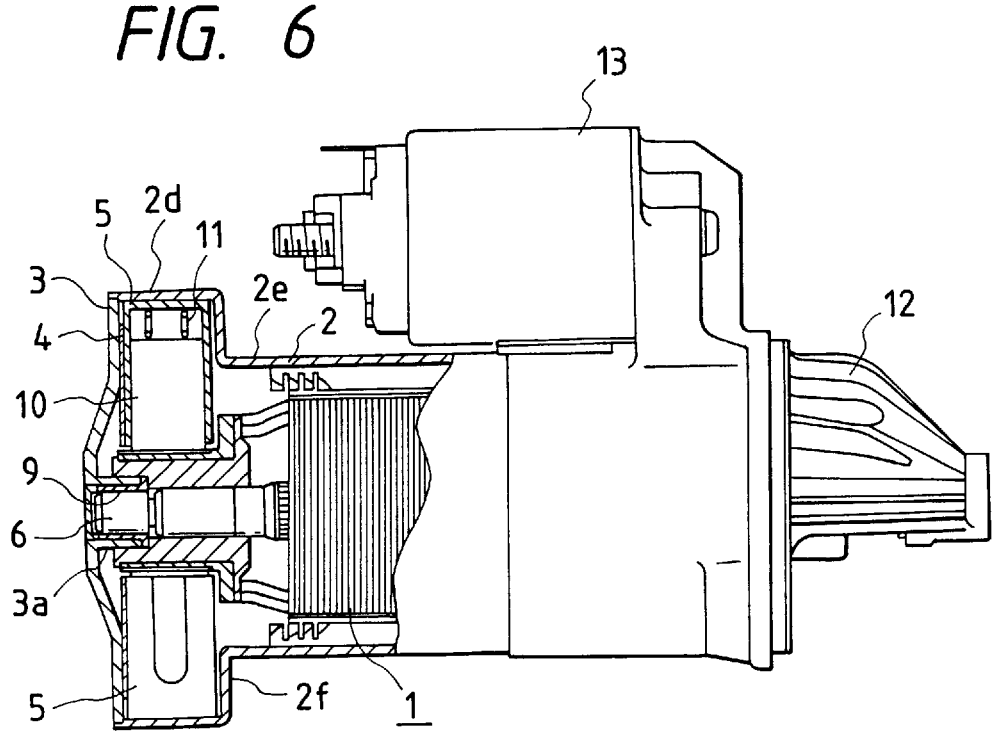
FIG. 6 is a sectional view showing a starter according to a further embodiment of the present invention.

FIG. 6 is a sectional view showing a starter according to Embodiment 5 of the present invention. In this Embodiment 5, the parts equivalent to or corresponding to those in Embodiments 1 to 4 are referenced correspondingly and the description about those parts are omitted here. In FIG. 6, a large-diameter cylindrical portion 2d is formed integrally with the yoke 2 through a flange-like disc portion 2f spread outward from the rear end portion of the cylindrical portion 2e of the yoke 2. A brush device having an outermost circumferential portion larger than the outer diameter of the small-diameter cylindrical portion 2e of the yoke 2 is received in the inside of the large-diameter cylindrical portion 2d. The outer circumference of the rear bracket 3 is fitted to the rear end of the large-diameter cylindrical portion 2d of the yoke 2.

Thus, since the large-diameter portion 2d is provided at the rear end of the yoke 2 in the aforementioned manner, the brush device whose diameter at the outermost circumferential portion is 1.5 times as large as the diameter of the small-diameter cylindrical portion 2e of the yoke 2 can be received. Accordingly, a long-life starter can be obtained by using sufficiently long brushes 10.

Further, a plate-like and disc-like simple-form rear bracket may be used in this embodiment.

Incidentally, the form of fixture of the brush holding frame 5 in this Embodiment 5 is the same as that in Embodiment 1.

Embodiment 6

Figure 7:
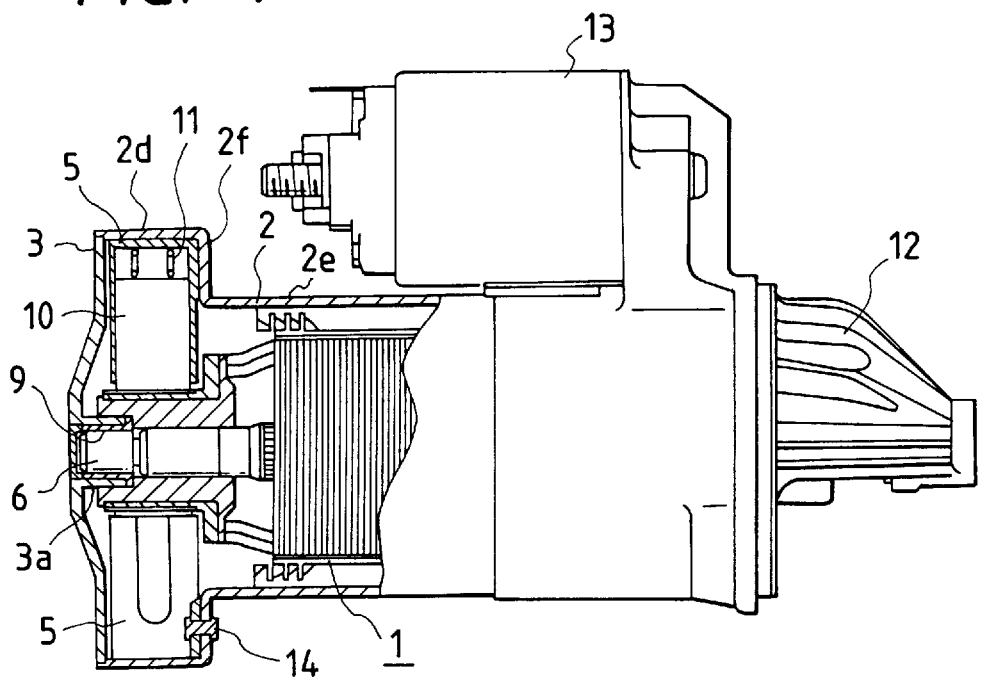
FIG. 7 is a sectional view showing a starter according to a still further embodiment of the present invention.

FIG. 7 is a sectional view showing a starter according to Embodiment 6 of the present invention. In this Embodiment 6, the parts equivalent to or corresponding to those in Embodiments 1 to 5 are referenced correspondingly and the description about those parts are omitted here. In this Embodiment 6, the large-diameter cylindrical portion 2d is formed on the rear end portion of the yoke 2 in the same manner as in the Embodiment 5 but the brush holding frames 5 are attached, by rivets 14, directly to a disc portion 2f provided between the small-diameter and large-diameter cylindrical portions 2e and 2d of the yoke 2.

In this manner, the disc portion 2f of the yoke 2 can serve also as a base for fixing the brush holding frames 5 as a constituent member of the brush device. Accordingly, not only the number of parts can be reduced but also a long-life starter can be obtained by using sufficiently long brushes 10.

Embodiment 7

Figure 8:
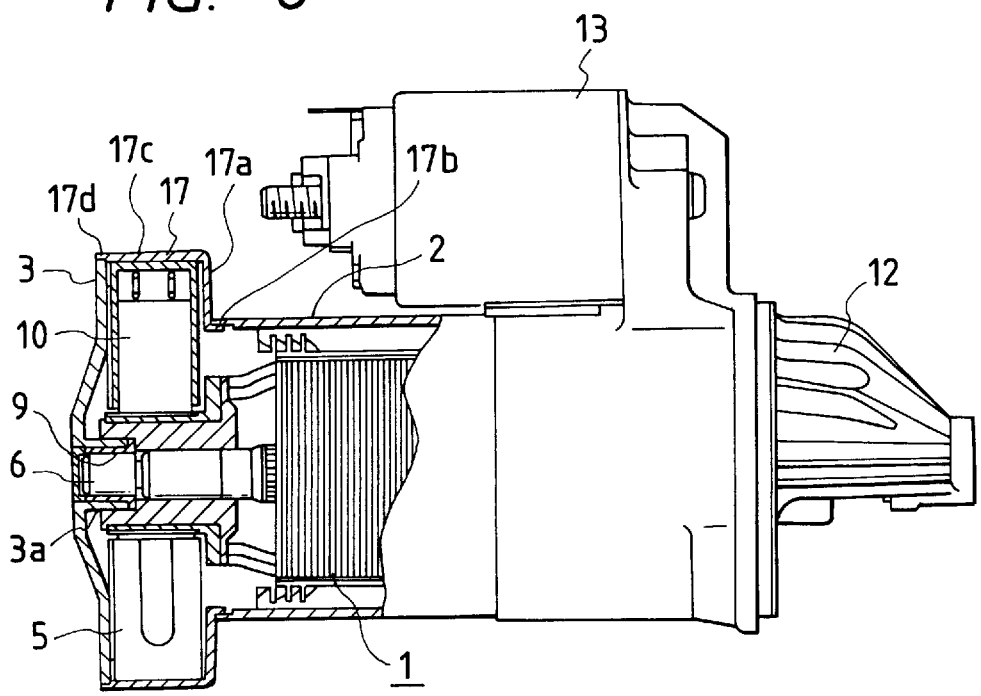
FIG. 8 is a sectional view showing a starter according to another embodiment of the present invention.

FIG. 8 is a sectional view showing a starter according to Embodiment 7 of the present invention. In this Embodiment 7, the parts equivalent to or corresponding to those in Embodiments 1 to 6 are referenced correspondingly and the description about those parts are omitted here. In this embodiment, there is used a cylindrical intermediate rear bracket 17 having an integrally formed flange-like annular disc portion 17a. That is, the intermediate rear bracket 17 is constituted by the flange-like annular disc portion 17a which is integrally formed at a front end portion perpendicularly to the axial direction, a front end opening portion 17b defining the inner circumference of the flange-like annular disc portion 17a, a large-diameter cylindrical portion 17c integrally formed with the rear end portion of the flange-like annular disc portion 17a, and a rear end opening 17d formed at the rear end of the large-diameter cylindrical portion 17c.

The cylindrical yoke 2 is fitted to the front end opening portion 17b of the intermediate rear bracket 17, and at the same time, the rear bracket 3 having the bearing 9 in its center portion for supporting the armature rotation shaft 6 is fitted to the rear end opening portion 17d of the intermediate rear bracket 17.

Incidentally, the form of fixture of the brush holding frames 5 is the same as that in the Embodiment 1.

When such an intermediate rear bracket 17 is used to be fitted and fixed to the rear bracket 3 and the yoke 2 respectively, a cylindrical yoke having a shape as simple as the shape of the conventional yoke can be used. Accordingly, there is no need of preparing for a new production apparatus. Furthermore, there is used the plate-like and disc-like simple-form rear bracket 3 having, in its center, the annular projection portion 3a fitted to the bearing 9 for supporting the armature rotation shaft 6. Accordingly, not only the cost of production can be reduced but also a long-life starter can be obtained by using sufficiently long brushes 10.

Embodiment 8

Figure 9:
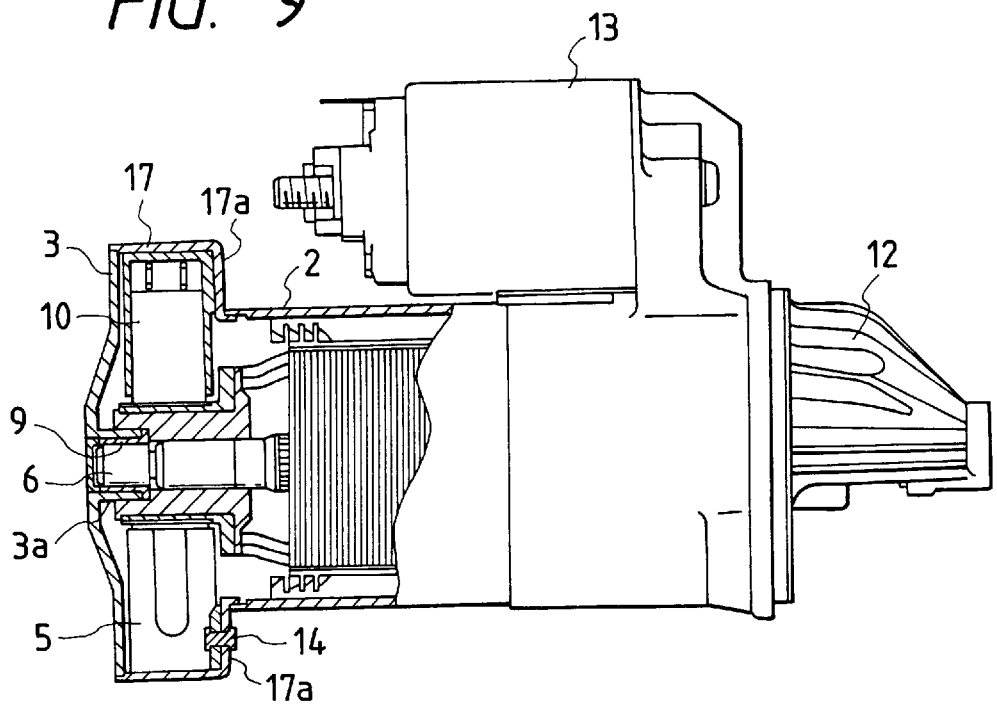
FIG. 9 is a sectional view showing a starter according to a further embodiment of the present invention.
Figure 10:
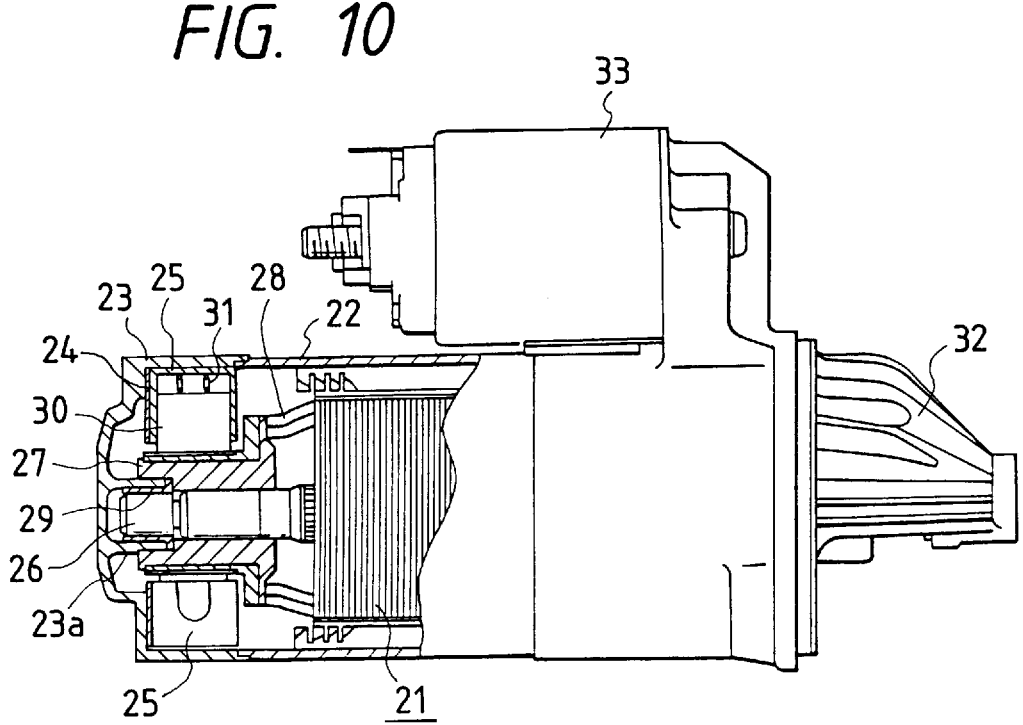
FIG. 10 is a sectional view showing a conventional starter.

FIG. 9 is a sectional view showing a starter according to Embodiment 8 of the present invention. In this Embodiment 8, the parts equivalent to or corresponding to those in Embodiments 1 to 7 are referenced correspondingly and the description about those parts are omitted here. In this Embodiment 8, the intermediate rear bracket 17 is used in the same manner as in the Embodiment 7 but the brush holding frames 5 are fixed, by rivets, directly to the disc portion 17a of the intermediate rear bracket 17.

In this manner, the intermediate rear bracket 17 can serve as a base for fixing the brush holding frames 5 as a constituent member of the brush device. Accordingly, not only the number of parts can be reduced but also a long-life starter can be obtained by using sufficiently long brushes 10.

What is claimed is:

1. A starter comprising:

a cylindrical yoke (2) having first and second end portions in an axial direction of said yoke;

a cylindrical brush receiving portion provided on said first end portion of said yoke, said brush receiving portion having an increased diameter relative to said yoke in a direction perpendicular to the axial direction of said yoke;

a first bracket (12) provided on said second end portion of said yoke; and a second bracket (3) fixed to said brush receiving portion so as to cooperate with said first bracket, wherein said brush receiving portion includes a cylindrical portion (3c) and a disc-like portion (2a) for connecting said cylindrical portion and said yoke to each other, and wherein said second bracket is fixed to said cylindrical portion, and further comprising:

a brush holder (5) fixed to said disc-like plate portion (2a) and disposed in said brush receiving portion.

2. A starter according to claim 1, wherein said cylindrical portion (3c) and said disc-like plate portion (2a) of said brush receiving portion are separate members.

3. A starter according to claim 1, wherein said disc-like plate portion (2a) of said brush receiving portion is integral with said yoke, and said cylindrical portion of said brush receiving portion is integral with said second bracket.

4. A starter according to claim 1, wherein said cylindrical portion (3c) and said disc-like plate portion (2a) of said brush receiving portion are integral with said yoke.

* * * * *